United States Patent [19]

Kisaichi

[11] Patent Number: 5,784,601
[45] Date of Patent: Jul. 21, 1998

[54] DATA PROCESSOR CAPABLE OF CHANGING SAMPLING TIME AND CLOCK FREQUENCY

[75] Inventor: Kazuhiro Kisaichi, Tokyo, Japan

[73] Assignee: Kabushiki Kaisha Toshiba, Kawasaki, Japan

[21] Appl. No.: 714,543

[22] Filed: Sep. 16, 1996

[30] Foreign Application Priority Data

Sep. 18, 1995 [JP] Japan .................... 7-238338

[51] Int. Cl.$^6$ ................................ G06F 1/08
[52] U.S. Cl. ............... 395/559; 395/555; 395/800.01
[58] Field of Search ................. 395/800.01, 555, 395/556, 559

[56] References Cited

U.S. PATENT DOCUMENTS 4,928,232  5/1990  Gentile ........................ 364/525
5,337,230  8/1994  Baumgartner et al. ........ 364/138
5,388,127  2/1995  Scarpa ........................... 375/120
5,568,530  10/1996  Saito et al. ................... 378/4
5,710,910  1/1998  Kehl et al. ..................... 395/551

*Primary Examiner*—Larry D. Donaghue
*Assistant Examiner*—Walter D. Davis, Jr.
*Attorney, Agent, or Firm*—Finnegan, Henderson, Farabow, Garrett & Dunner, L.L.P.

[57] ABSTRACT

A data processor that gives necessary and sufficient precision of analog-to-digital (A/D) conversion results according to the processing contents and the processing mode includes an A/D converter that digitizes an analog signal by repeatedly sampling and holding the signal at a frequency given by a clock signal, a coordinates processing part that obtains one piece of processing data by averaging n pieces of data output from the A/D converter, and a sampling-time/frequency control part that changes the number n and the sampling frequency to obtain a necessary precision of digital data.

5 Claims, 9 Drawing Sheets

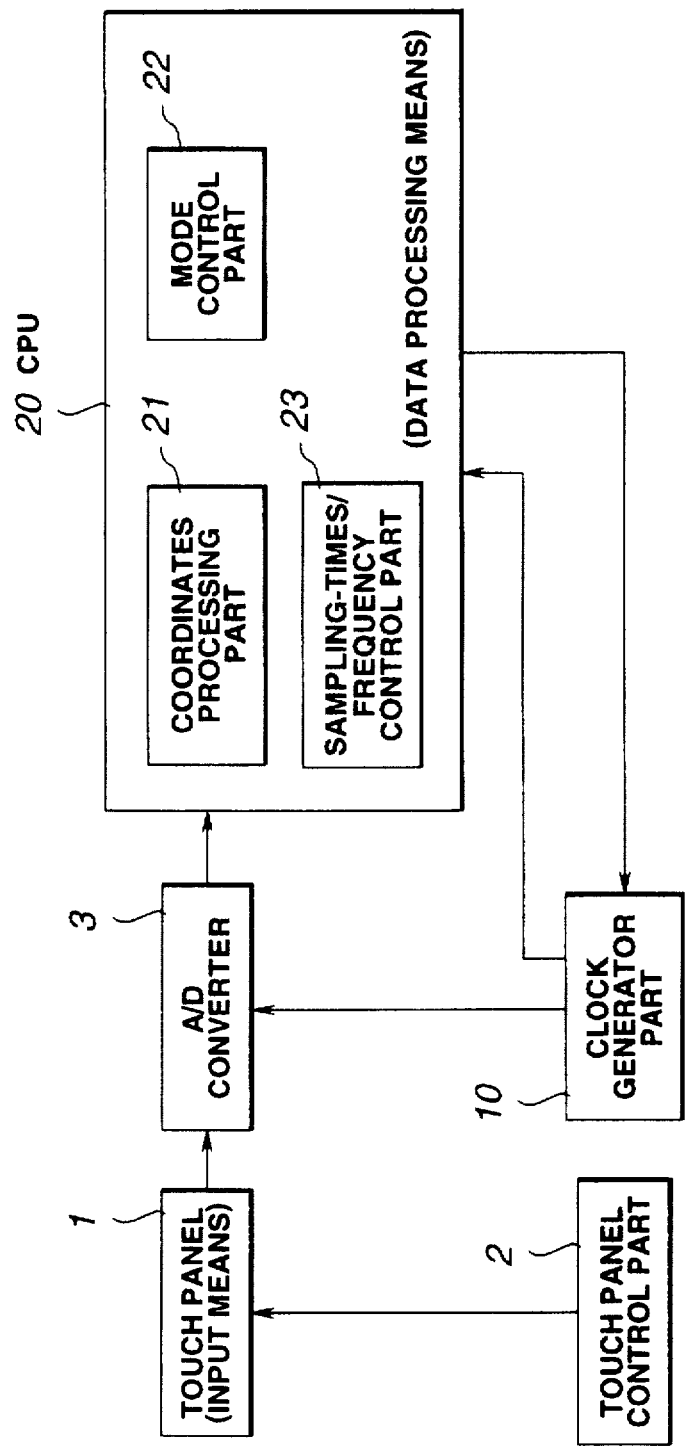

FIG.2

| COMPONENT \ POWER DISSIPATION MODE | NORMAL | IDLE | STOP |
|---|---|---|---|
| CPU | OPERATIVE | INOPERATIVE | INOPERATIVE |
| I/O PORT | OPERATIVE | OPERATIVE | INOPERATIVE |
| TIMER | OPERATIVE | INOPERATIVE | INOPERATIVE |
| PATTERN GENERATOR | OPERATIVE | INOPERATIVE | INOPERATIVE |
| SERIAL INTERFACE | OPERATIVE | INOPERATIVE | INOPERATIVE |
| WATCHDOG TIMER | OPERATIVE | INOPERATIVE | INOPERATIVE |
| INTERRUPT CONTROLLER | OPERATIVE | OPERATIVE | OPERATIVE |

FIG.3

| MODE | SAMPLING FREQUENCY, f | NUMBER OF SAMPLING TIMES, n |
|---|---|---|
| INITIAL SCREEN | f1 | n1 |
| MENU SCREEN | f2 | n2 |
| HANDWRITE SCREEN | f3 | n3 |

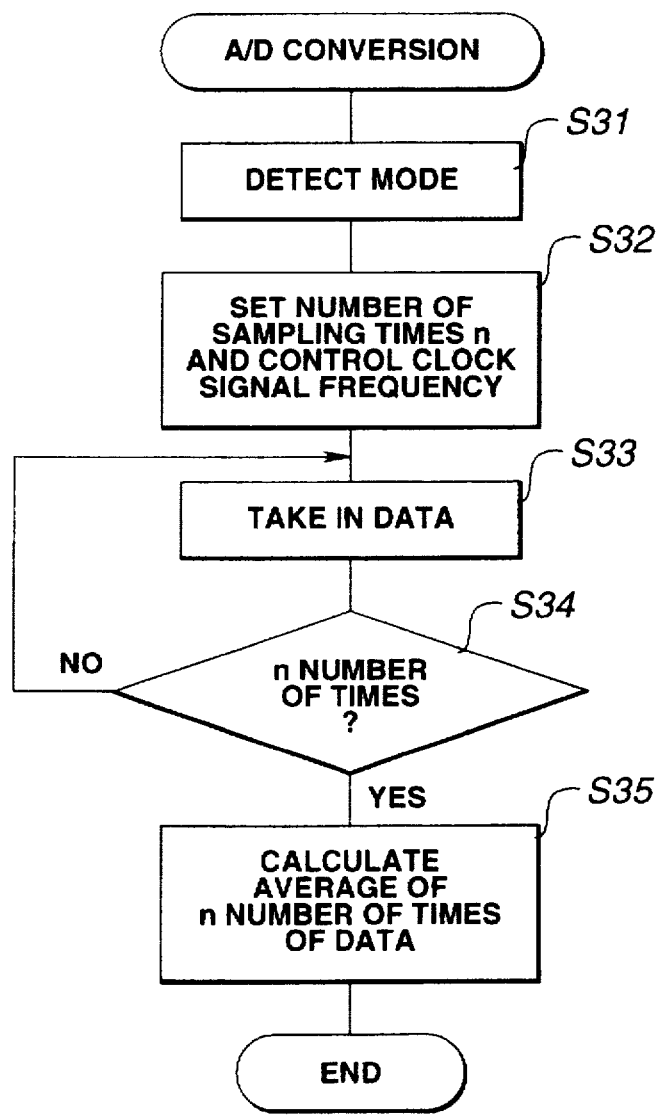

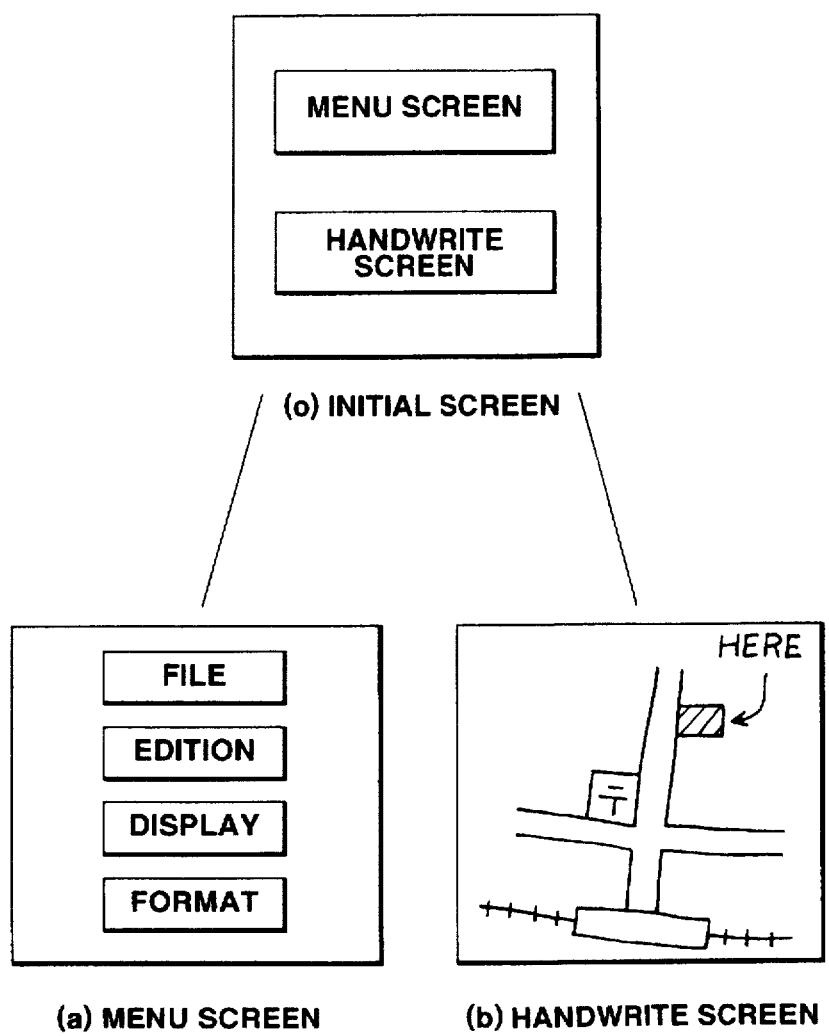

NUMBER OF SAMPLING TIMES : 1

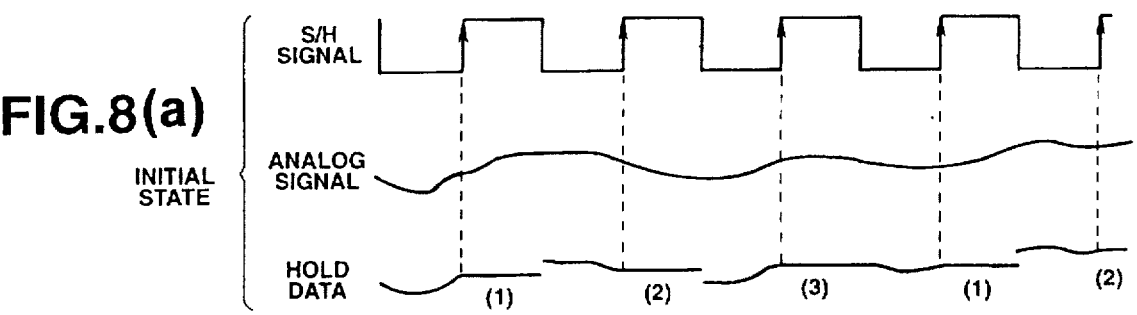
FIG.8(a) INITIAL STATE
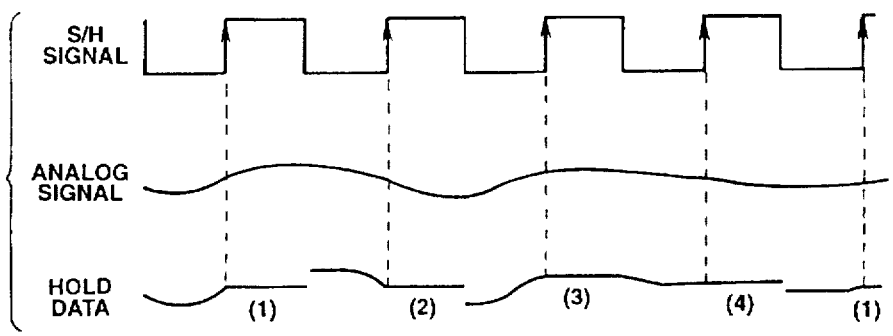
FIG.8(b) AFTER NUMBER OF HOLDING TIMES IS CHANGED
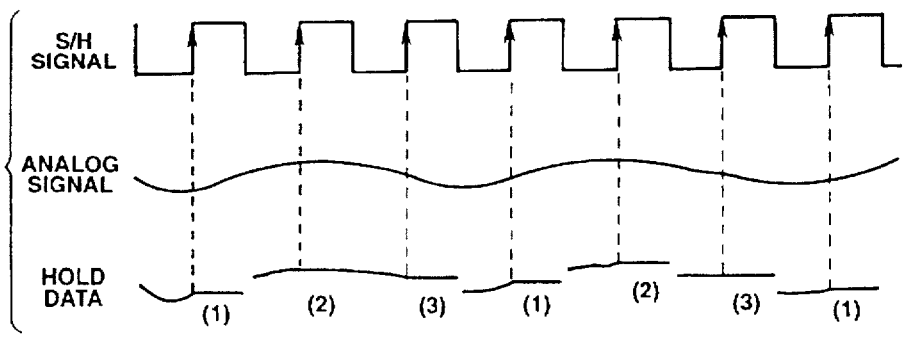
FIG.8(c) AFTER SAMPLING FREQUENCY IS CHANGED

1

DATA PROCESSOR CAPABLE OF CHANGING SAMPLING TIME AND CLOCK FREQUENCY

[BACKGROUND OF THE INVENTION]

1. Field of the Invention

The present invention relates to the battery-driven type of data processor particularly such as Personal Digital Assistants (PDA).

2. Description of the Related Art

Generally, the terminal device using a touch panel as its input part has such a configuration as shown in FIG. 11. When a pen input is given somewhere on a touch panel 1 with voltage or any other stimulus being applied onto the panel of the input part of the terminal, an electric potential according to the coordinates point on the panel is sent to an A/D converter 3. The A/D converter 3 then digitizes the potential of the analog signal according to the coordinates based on the clock signal of a prescribed frequency given by a clock signal generator 4. Thus digitized data is sent to a CPU (Central Processing Unit) 5 and processed as coordinates values. The CPU5 comprises a coordinates processor part 6 and a register 7 in which the number of sampling times n is set fixedly, to take in, based on this fixed number of sampling times. n number of data pieces digitized at abovementioned A/D converter 3 so that those n number of data pieces may be averaged to provide coordinates data values.

More specifically,the A/D converter 3, as shown in FIG. 6, uses a clock signal given by the clock signal generator 4 as the S/H (SAMPLE/HOLD) signal to digitize an analog signal concerned with an input. FIG. 7 enlarges the waveforms of those signals at time of this processing, showing that the analog signal is sampled at the leading edge of the S/H signal and that the level of an analog signal sampled earlier is held as it is during the holding period, i.e. H level period, of the S/H signal. The coordinates processor part 6 takes in n number of times of those hold values to average them.

The terminal device has a plurality of processing modes such as the "Handwrite" mode to enable the inputting of handwritten graphics and the "Menu screen" mode to enable the selective inputting using a plurality of menus. In the "Handwrite" mode, A/D converted values need to be of a high precision, while in the "Menu screen" mode, those values need not necessarily be of a high precision. However, in order to use the same number of sampling times fixed at the register 7 in both of the processing modes, the value n of that number set and fixed at the register must be of a high precision. In a processing mode such as the "Menu screen" mode, therefore, unnecessary sampling and/or averaging are executed partially, so that the CPU5 virtually idles to delay processing.

The object of the present invention is to provide a data processor which enables it to change the precision of the A/D conversion results as occasion demands so that the CPU can execute its tasks in a minimum required processing time.

[SUMMARY OF THE INVENTION]

A data processing system according to the present invention comprises: input means, e.g. touch panel, at which data is entered; a clock signal generator part which generates a clock signal having a prescribed frequency; an A/D converter which, based on this clock signal sent from this clock signal generator part, digitizes an analog signal sent from the abovementioned input means by repeating the sampling and holding operation of it; a processing part which obtains one piece of processing data by averaging n number of times of output data held by the A/D converter; a sampling-times control part which gives the processor part a number of averaging times n properly changed; and data processing means which takes in the data digitized by the abovementioned A/D converter thereby executing the processing of the data sent from the abovementioned input means. This data processing includes the display of handwritten graphics entered, the recognition of handwritten characters and that of marks by use of an OMR, and the transmission of data by use of facsimile.

Note that the clock signal generator part of a data processor according to the present invention can generate different frequencies of clock signals when it is controlled to do so by a frequency control part provided to this processor.

The data processor according to the present invention is also provided with a mode control part that uses the first processing mode which requires the data averaged after being sampled by use of the first number of sampling times and the second processing mode which requires the data averaged after being sampled by use of the second number of sampling times, which is larger than the first one, and also that detects which one of those two modes the system is in and, at the same time, sends to the sampling-times control part an indication of the number of sampling times according to the detection results.

Moreover the data processor according to the present invention detects which one of a plurality of processing modes the system is in and, based on the detection results, sends the indication of an appropriate number of sampling times and an appropriate clock frequency to the sampling-times control part and the frequency control part respectively.

The processing part of a data processor according to the present invention comprises modules having a plurality of power dissipation modes and is also provided with a power dissipation mode control part which controls those modules in such a way as to select one of those power dissipation modes in which they should operate according to the processing mode of the processor.

[BRIEF DESCRIPTION OF THE DRAWINGS]

The present invention is illustrated diagrammatically in the following drawings wherein:

FIG. 1 is a block diagram of a data processor according to the present invention;

FIG. 2 is a table descriptive of the power dissipation modes in which the processing part of a data processor according to the present invention operates;

FIG. 3 is a memory table provided to the main part of a data processor according to the present invention;

FIG. 4 is a flowchart descriptive of the operations of the first embodiment of the present invention;

FIG. 5 is a diagrammatic view illustrating the switching of the processing modes of the first embodiment of the present invention;

FIGS. 8A, 8B, 8C are a set of time charts descriptive of the sampling/holding operation of the second embodiment of the present invention;

3

Figure 9:
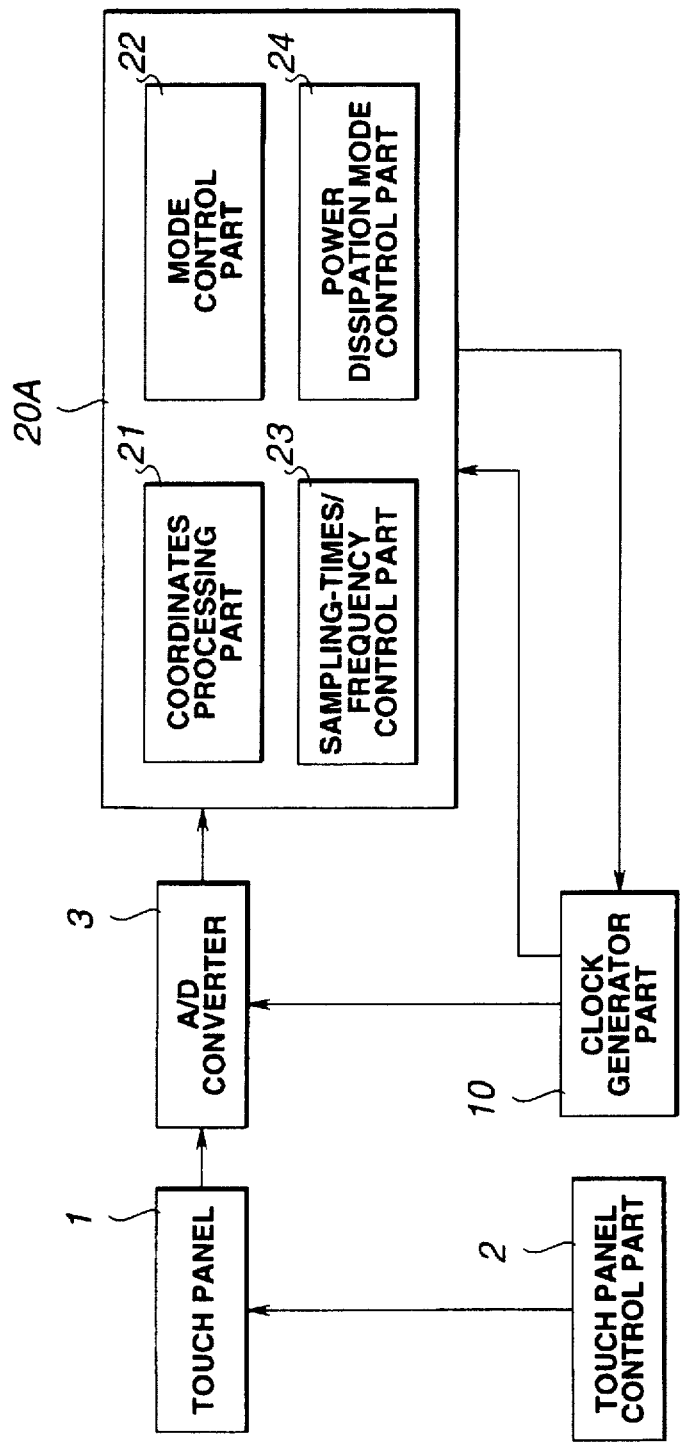
Figure 10:
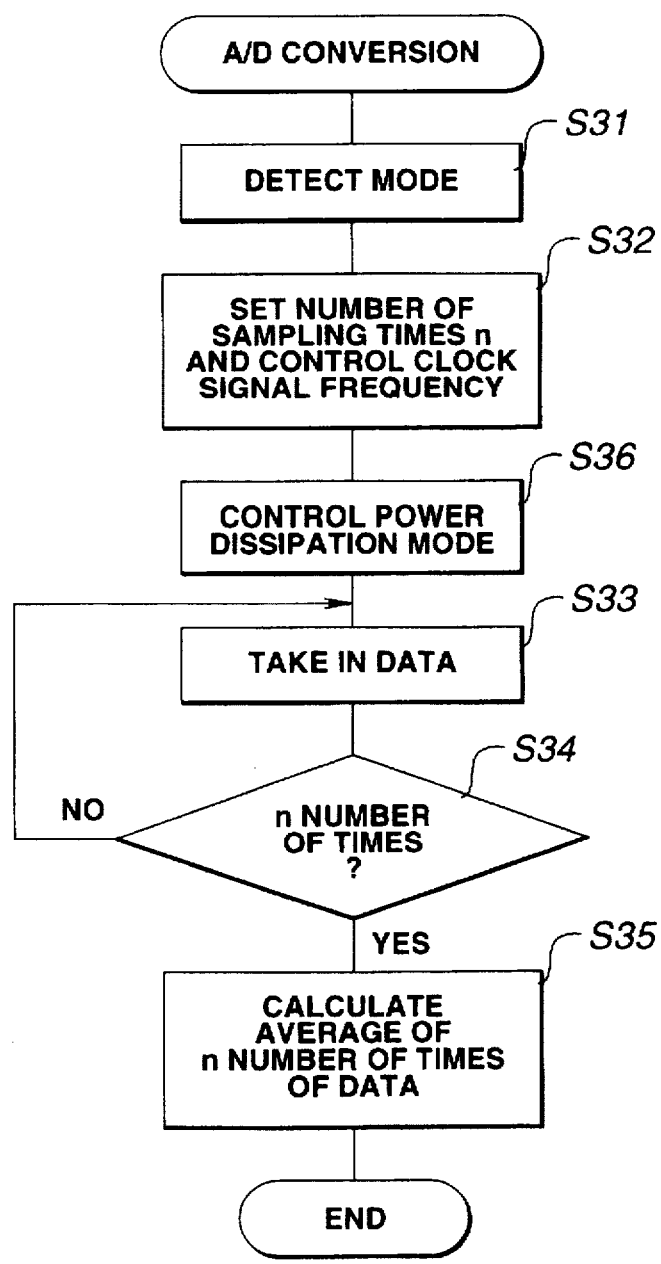
Figure 11:
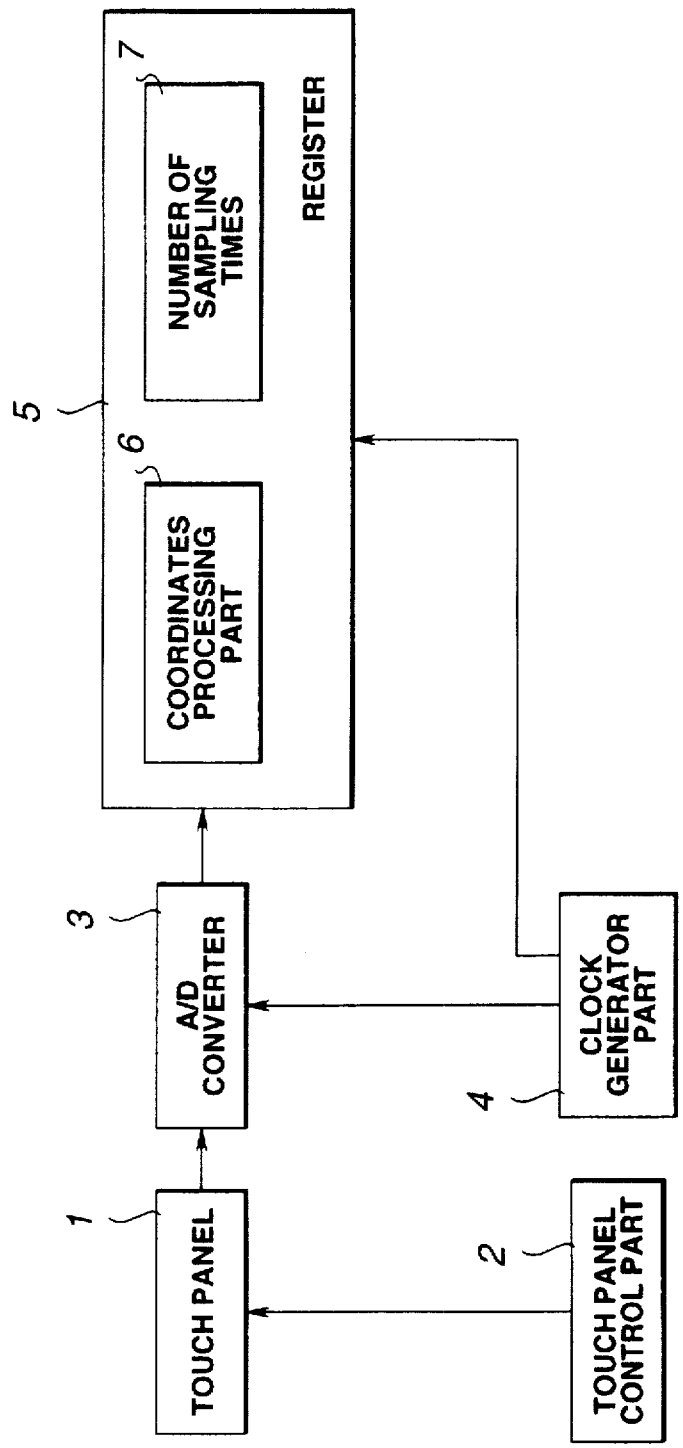

FIG. 9 is a block diagram of the second embodiment of the present invention;

FIG. 10 is a flowchart descriptive of the second embodiment of the present invention; and FIG. 11 is a block diagram of general data processors.

[DETAILED DESCRIPTION]

FIG. 1 shows a data processor according to the present invention. As shown in it, voltage or any other stimulus is applied from a touch panel control part 2 to a touch panel 1 (input medium). If a pen input is given onto the touch panel 1 in this state, an electric potential according to the point in the coordinates on the panel is sent to an A/D converter 3. The touch panel 1 comprises a LCD or any other display part and two sheets of transparent anisotropic conductive material placed thereon, so that a pen touch on it makes it conductive between those two sheets to obtain potentials according to the resistance values existent in X-axial and Y-axial directions respectively. This type of the touch panel 1 is detailed in U.S. patent application Ser. No. 08/616,317.

The data digitized at the A/D converter 3 is taken in by a CPU20 in data processing means and then sent to a coordinates processing part 21 for averaging, to work out coordinates values. The CPU20 is provided with a mode control part 22 and a sampling-times/frequency control part 23. The mode control part 22 detects the processing mode based on coordinates values obtained at the abovementioned coordinates processing part 21 and then sends an indication of both a number of sampling times and a clock signal frequency according to this processing mode to the sampling-times/frequency control part 23. This data processor has three processing modes of the "Initial screen" mode, the "Menu screen" mode, and the "Hand write screen" mode as shown in FIG. 3. The mode control part 22 is provided with a table in which to each of those three processing modes, the required sampling frequency f and number of sampling times n correspond. Besides this table, the mode control part 22 has another table that stores coordinates values which will appear when each display point of the character string of the "Menu screen" or the "Handwrite screen" displayed in, for example, the "Initial screen" mode is indicated on the touch panel 1 and also does it have a pointer that indicates the mode in which the system is operating presently.

The CPU20 operates its own various parts mentioned above in accordance with the program of a flowchart shown in FIG. 4. When the system of a data processor is activated, the pointer giving the present mode indicates the "Initial screen" mode and the CPU20 sends to the display part such as a LCD not illustrated here the graphics data of the "Initial screen" such as shown in FIG. 5 (o) so that the corresponding display may be given. In this "Initial screen" mode, as shown in FIG. 3, the sampling frequency f must be f1 and the number of sampling times, n1. To ensure it, the data of sampling frequency f1 and number of sampling times n1 are sent from the mode control part 22 to the sampling-times/frequency control part 23. The sampling-times/frequency control part 23 gives a control signal to a clock signal generator part 10 to cause it to send out a clock signal having a sampling frequency fr and also gives a number of sampling times n1 to the coordinates processing part 21 to cause it to obtain, as one coordinates value, the average of n1 number of data pieces taken in. The clock signal generator part 10 has such a mechanism as to selectively generate clock signals of different frequencies or to give a plurality of frequencies of clock signals by, for example, dividing the original clock signal frequency, so that a desired one can be sent out.

4

The operations of the abovementioned components are explained below as those of the CPU20. First, the CPU20 detects the processing mode as shown in a flowchart in FIG. 4 (S31). Here, the CPU20 detects the "Initial screen" mode as referring to the pointer. Next, the CPU20 fetches from the table a sampling frequency f1 and a number of sampling times n1 which correspond to this "Initial screen" mode and then sets the value n1 at its own register and also causes the clock signal generator part 10 to generate a clock signal based on the value f1 (S32), thereby taking in (sampling) data which arrives at the A/D converter 3 (S33). The CPU20 thus takes in data as detecting whether the number of data take-in times has reached the number of sampling times n1 set at the register (S34). If the number of data take-in times has not reached n1, the CPU20 continues further take-in operation of data until the number of data pieces which have been held reaches n1, whereupon it calculates the average of those data pieces taken in as many as n1 number of times (S35) to provide one coordinates value. The CPU20 then detects whether this coordinates value thus obtained at step S35 corresponds to the "Menu screen" area coordinates or the "Handwrite screen" area coordinates of the initial screen (FIG. 5 (o)) and, in the former case, it obtains a number of sampling times n2 and a sampling frequency f2 from the FIG. 3 table. In the latter case, the CPU20 obtains a number of sampling times n3 and a sampling frequency f3.

If a pen input is detected in the "menu screen" area when the "Initial screen" is displayed, the CPU20 transfers the pointer into the "Menu screen" mode and sends the data of such "Menu screen" graphics as shown in FIG. 5 (a) to a LCD or any other display part not illustrated here, to cause it to give the corresponding display. If, on the other hand, a pen input is detected in the "Handwrite screen" area when the "Initial screen" is displayed, the CPU20 transfers the pointer into the "Handwrite screen" mode and sends the data of such "Handwrite screen" graphics as shown in FIG. 5 (b) to the LCD or any other display part not illustrated here, to cause it to give the corresponding drawing display.

When the "Handwrite screen" mode is entered, the CPU20 sets a clock signal frequency f3 at and also takes in the position data of a pen input on touch panel 1 as many as n3 number of sampling times, to calculate the average of those data pieces as one coordinates data value. Thus obtained coordinates values are sent by the CPU20 to the display part as display data, to give a drawing display of a map such as shown in FIG. 5 (b).

Figure 6:
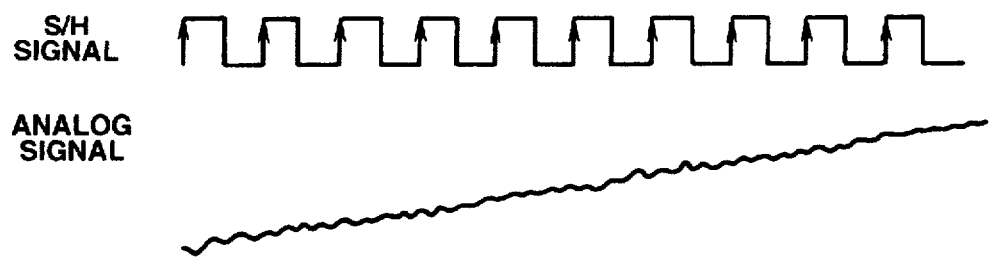
FIG. 6 is a time chart descriptive of the sampling/holding operation of the A/D converter used in a data processor according to the present invention.
Figure 7:
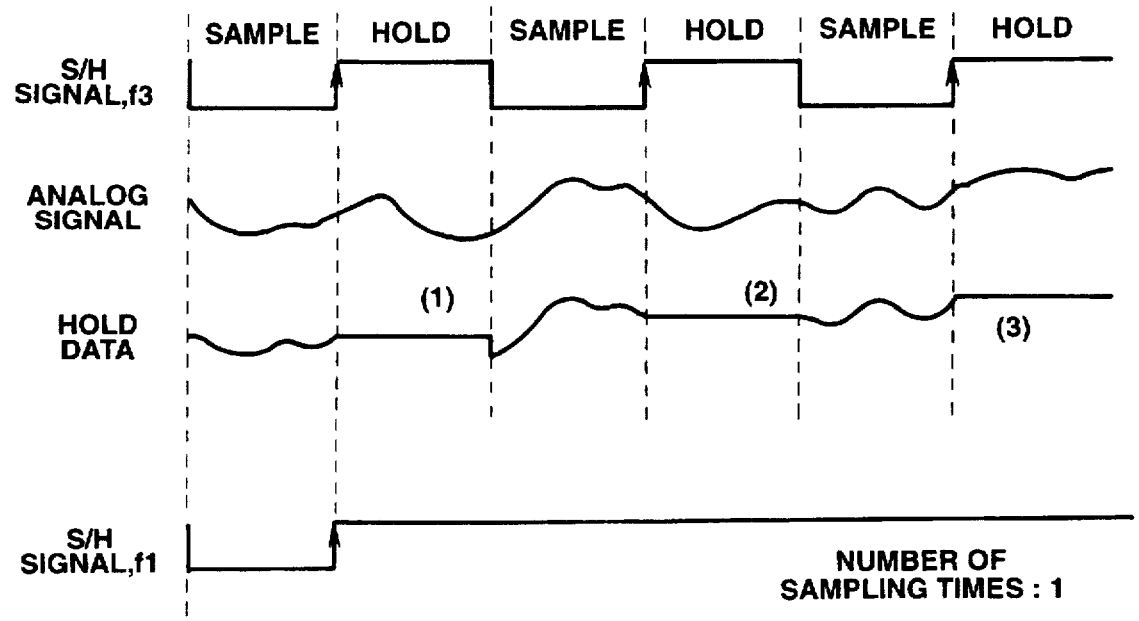
FIG. 7 is an expanded time chart descriptive of the sampling/holding operation of the A/D converter used in a data processing system according to the present invention.

As for the sampling frequency f, as can be seen by the S/H signal (f3) and the S/H signal (f1) in FIG. 7, the "Handwrite screen" mode employs the clock signal of a sampling frequency higher than value f1 employed in the "Initial screen" mode. As for the number of sampling times n also, the "Handwrite screen" mode employs value n3 larger than n1 employed in the "Initial screen" mode. Here, as can be seen from Sections (1) through (3) in FIG. 7, the number of sampling times is three in the "Handwrite screen" mode, whereas it is one in the "Initial screen" mode.

FIG. 1 shows a data processor which would change both the sampling frequency and the number of holding times according to the processing mode. FIG. 8, on the other hand, shows the waveforms of a data processor which would change only the number of holding times when the mode is changed from the initial state of FIG. 8(a) and also those of another data processor which would change only the sampling frequency when the processing mode is changed from the initial state of FIG. 8(a).

In the initial state of FIG. 8(a), the S/H signal having one frequency is used to carry out the sampling and holding operation of an analog signal in order to hold it three times so that three times of data can be averaged to obtain one piece of digital data. On the other hand, in the case of FIG. 8(b), in which only the number of holding times is changed, the S/H signal having the same frequency as that in the case of FIG. 8(a) above is used after the processing mode is changed, to carry out the sampling and holding operation of an analog signal in order to hold it four times so that four times of data can be averaged to obtain one piece of digital data. By doing so, data can be held as many as a number of times larger than in the case of the initial state of FIG. 8(a) to obtain a higher precision of digital data. Moreover, in the case of FIG. 8(c), in which only the sampling frequency is changed, the S/H signal having a frequency higher than that in the initial state of FIG. 8(a), i.e. 1.5 times, is used after the processing mode is changed, to carry out the sampling and holding of an analog signal to hold it the same three times as in the initial state of FIG 8(a) so that three times of data can be averaged to obtain one piece of digital data. This technique also employs a higher sampling frequency to sample the data a larger number of times in a short period of time, so that a higher precision of digital data can be obtained.

FIG. 9 shows a data processor according to the second embodiment of the present invention. In this data processor, the processing part composed of a CPU20A and others components comprises various modules having a plurality of power dissipation modes. As shown in FIG. 2, for example, the microcomputer which composes the processing part comprises a CPU, an I/O port, a timer, a pattern generator, a serial interface, a watchdog timer, and an interrupt controller as its components which have three power dissipation modes of the normal mode, the idle mode, and the stop mode. In the normal mode, those components are all in the operative state; in the idle mode, only the I/O port and the interrupt controller are in the operative state; and in the stop mode, only the interrupt controller is in the operative state. In the stop state, none of the components is supplied with power to lower power dissipation. As a module having such a power dissipation mode, TLCS-900L (CPU module) made by Toshiba can be used.

To control the abovementioned power dissipation mode, the CPU20A has a power dissipation mode control part 24, which would select one of the abovementioned three power dissipation modes according to the processing mode detected by a mode control part 22.

FIG. 10 shows a flowchart for A/D conversion carried out by a data processor according to the second embodiment of the present invention. The processings shown by this flowchart are basically the same as the A/D conversion carried out by a data processor according to the second embodiment of the present invention, except that the power dissipation mode is controlled (S3G) after the number of sampling times n is set and the clock signal frequency is controlled (S32). If, for example, mode control part 22 detects the "Handwrite screen" mode, power dissipation mode control part 24 selects the normal mode of power dissipation; if the former detects the "Menu screen" mode, the latter selects the idle mode; and if the former detects the "Initial screen" mode, the latter selects the stop mode.

With this technique, when the system is in the "Initial screen" mode or the "Menu screen" mode, the data processor can wait in the idle mode for interruption caused by an input on the touch panel to enable data input at the I/0 port, to lower power dissipation in operation. After this operation of power dissipation mode controlling (S36), the same processing as described with FIG. 4 is carried out.

The abovementioned configuration is effective especially for portable terminals using PDA, etc. as the data processor because it enables a long-time operation even if they are driven by batteries. Note that, in contrast to the abovementioned case where the number of sampling times and the frequency are automatically changed, such a configuration is also possible that the operator can change or select those values. In this case, moreover, it is possible that the number of sampling times and the frequency selected and set by the operator would be given priority to those values automatically changed and set when the processing mode has been changed. Also, not only the number of sampling times and the frequency, the power dissipation mode can be selected and set by the operator.

The present invention can be applied not only to the abovementioned data processor including PDA which has the touch panel 1 but also to any other electronic devices such as an image processor, an OCR, a facsimile, and an OMR. In the case of those devices, the CPU20 or the CPU20A will execute image display and contraction and also character recognition, facsimile transmission, mark recognition, etc.

In any device using a data processor according to the present invention, the number of sampling times n can be changed to obtain a required precision of digital data by averaging because the precision of the A/D conversion results can be changed as occasion demands. Also, the clock signal frequency can be changed to sample required amount of analog data in a minimum required period of time, so that an appropriate precision of digital data can be obtained. Moreover, each time data is entered, the number of sampling times and the clock signal frequency are automatically changed, so that the job required only for changing them can be eliminated to save time required to obtain a necessary precision of digital data.

I claim:

1. A data processor comprising:

inputting means for inputting analog data;

generating means for generating a clock signal having a prescribed frequency;

converting means for converting said analog data into digitized data in accordance with said clock signal;

averaging means for averaging said digitized data at a first sampling time or a second sampling time which is bigger than said first sampling time;

first changing means for changing a selected one of said first and second sampling times;

second changing means for changing said frequency of said clock signal;

determining means for determining whether said averaging means averages said digitized data at said first sampling time or said second sampling time;

detecting means for detecting a frequency of said clock signal; and supplying means for supplying the determined sampling time to said first changing means and for supplying the detected frequency to said second changing means.

2. The data processor of claim 1, wherein said averaging means averages said digitized data at the selected sampling time without high-precision values for operation.

3. The data processor of claim 1, wherein said averaging means averages said digitized data at the selected sampling time with high-precision values for operation.

4. The data processor of claim 1, wherein said averaging means averages said digitized data at said first sampling time without high-precision values for operation and digitized data at said second sampling time with high-precision values for operation.

5. A data processor comprising:

inputting means for inputting analog data;

generating means for generating a clock signal having a prescribed frequency;

converting means for converting said analog data into digitized data in accordance with said clock signal;

averaging means for averaging said digitized data at a sampling time, in one of power dissipation modes;

first changing means for changing said sampling time;

second changing means for changing said frequency of said clock signal; and selecting means for selecting a power dissipation mode in which said averaging means averages said digitized data.

* * * * *